Sept. 12, 1950 L. H. YOCUM 2,522,331
MOTOR ATTACHMENT FOR LAWN MOWERS
Filed Feb. 4, 1947 2 Sheets-Sheet 2

Inventor
L. H. YOCUM
By J. K. Bryant
Attorney

Patented Sept. 12, 1950

2,522,331

UNITED STATES PATENT OFFICE 2,522,331

MOTOR ATTACHMENT FOR LAWN MOWERS

Lewis H. Yocum, Humboldt, Iowa

Application February 4, 1947, Serial No. 726,350

1 Claim. (Cl. 180—19)

This invention relates to motor attachments for hand-operated lawn mowers, whereby the latter may be made power-operated at very little expense by adapting any type of available motor of suitable power.

The object of this invention is to provide inexpensive means for converting a hand-operated lawn mower into a power-driven lawn mower.

Another object is to make such conversion by supplying a motor platform mounted on adaptor fittings over the cutter bars, and replacing the usual guide rollers by a drive roller of large diameter provided with a V-groove for belt drive from a motor mounted on the platform.

Another object is to make the above platform slidably mounted for adjustment in a fore and aft direction.

A further object is to provide resilient means to urge the above platform in the foreward direction to take up the play in the belt drive between the motor pulley and the drive roller.

A further object is to provide means pulling the motor platform rearwardly against said resilient means and locking it in such position to release the belt drive and allow the motor to run idle, when it is desired to stop the lawn mower temporarily.

Another object is to make the above adaptor fittings extensible to fit any size of lawn mower.

Another object is to make the above drive rollers with a corrugated or grooved surface to provide good traction on the grass.

Other and more specific objects will become apparent in the following detailed description of a preferred form of the present invention, having reference to the accompanying drawings, wherein:

Figure 5 is a detail sectional view taken on line 5—5 of Figure 1, showing the anchoring means used on the adaptor fittings, and Figure 6 is a sectional view of the platform locking means taken on line 6—6 of Figure 2.

Figure 1:
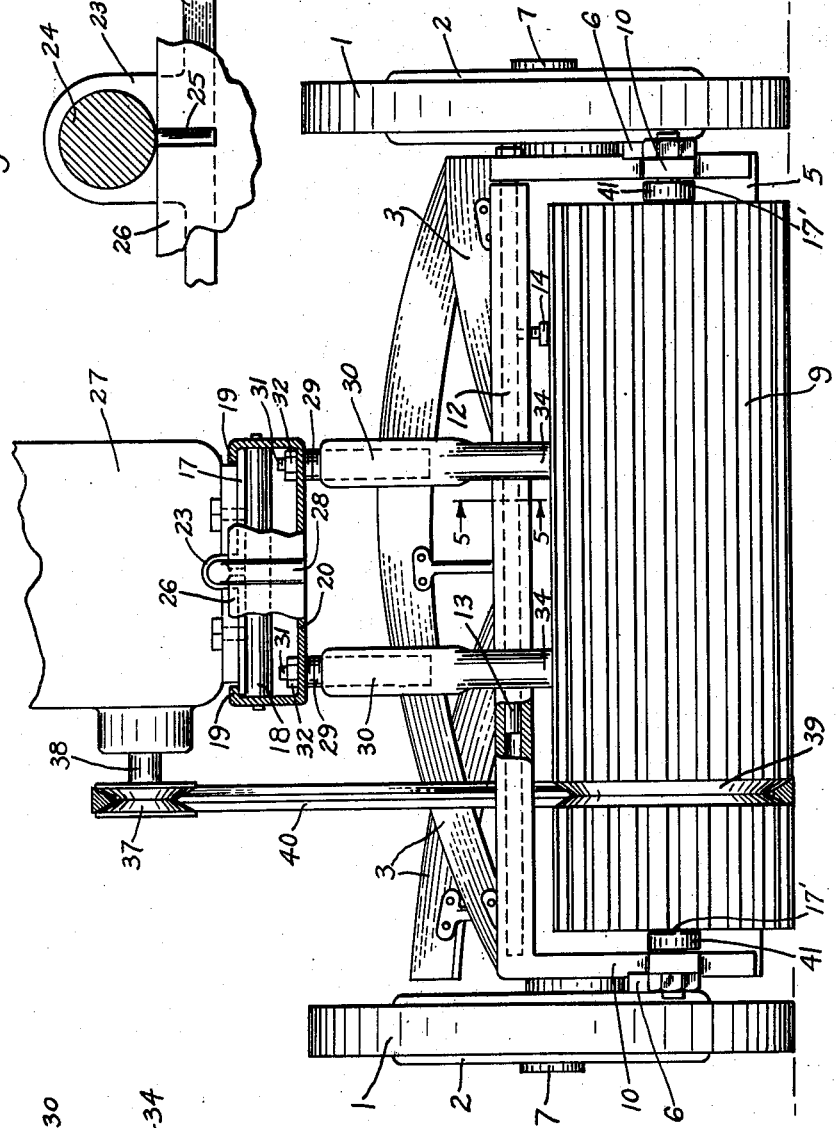
Figure 1 is a rear elevational view of the device as applied to a lawn mower.
Figure 2:
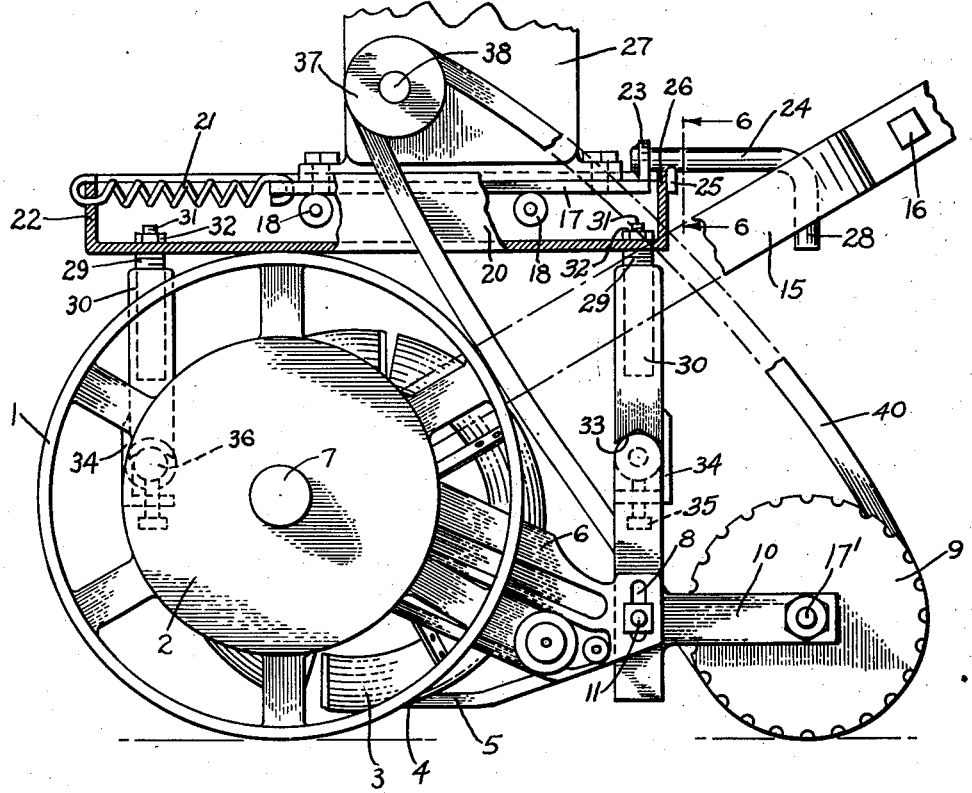
Figure 2 is a side elevation thereof.
Figure 3:
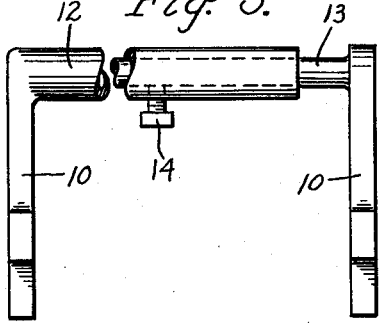
Figure 3 is a rear view of a part of the adaptor fittings showing their extensible character to fit different sized lawn mowers.
Figure 4:
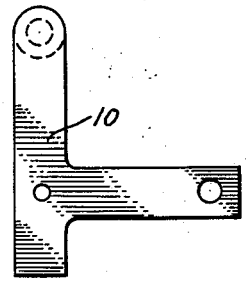
Figure 4 is an end view thereof.

The usual hand lawn mower has a pair of wheels 1 with gearing in their hubs 2 which drives the helical cutter bars 3 across the edge 4 of a stationary transverse cutter bar 5 mounted on the frame 6. The frame 6 is hinged on wheel axles 7 and carries the cutter drive shaft, and a guide roller at its rear end which is usually adjustably mounted for vertical adjustment by means of vertical slots 8 in which the guide roller bearing supports are fastened. These bearing supports and guide roller have been removed here, and are replaced by the large roller 9 rotatably mounted on shaft 17' supported in brackets 10 which are mounted by bolts 11 for vertical adjustment in slots 8. As shown in Figure 2, brackets 10 are fixed to telescoping shafts 12 and 13 respectively, the outer shaft 12 being provided with a set screw 14 for locking the shafts in any extended position, depending on the size of the lawn mower. The yoke 15 hinged to the wheel axles 7 is usually fixed to the lawn mower handle by bolts 16.

A motor platform 17 with motor 27 fixed thereto is slidably mounted over rollers 18 and under the shoulders 19 in platform support 20. Spring 21 fastened between the platform and the front end 22 of the support urges the platform in a forward direction. An upturned ear 23 on the rear end of the platform has an operating handle shaft 24 rotatably mounted therein with a handle 28 for pulling the platform rearwardly against the force of the spring 21. A pin 25 is provided in one side of the handle shaft 24 for catching over the rear edge 26 of the support 20 when it is desired to lock the motor 27 in released position, by turning the operating handle 28 downwardly after drawing the platform support rearwardly, as shown in the drawings.

The support 20 is supported by four uprights each comprising threadedly engaged members 29 and 30 for adjusting their length. The upper member 29 is provided with a stud 31 which is passed through an opening in the support 20 for the holddown nuts 32. The lower member 30 is provided with shaft anchoring means consisting of a grooved end 33 on said member and a bracket 34 welded to the side of said member and extending beyond the grooved end to support a set screw 35 in opposed relation to said grooved end to form therewith a clamping means around any shaft inserted therebetween. The two forward uprights are thus clamped to the bar 36 usually forming a spacer rod for the front part of frame 6. The rear uprights are mounted on the outer shaft 12 of the drive roller support brackets 10.

The motor 27 has a V-grooved pulley 37 on its shaft 38 and the drive roller 9 has a V-groove 39 in its periphery in alignment with said pulley. A suitable V-belt 40 forms the driving connection between the motor and said roller when the platform is released so that the spring 21 pulls it back to take up any slack in the belt drive. However, when the platform is drawn backward by means of the handle 28, slack is provided in the belt drive, permitting the motor to run idle and the lawn mower to stop temporarily, until the platform is again released. The platform may be locked in the drawn position by turning the handle 28 so as to catch the pin 25 over the edge 26 of the support 20, to keep the motor disengaged. Upon release of the platform from the locked position by simply turning the handle 28 to release the pin 25, the motor and its support will be drawn forward by spring 21 and will resume driving the lawn mower.

A series of spacers 41 of various thicknesses may be provided for selective use on shaft 17 to properly space the roller 9 in different-sized lawn mowers. The roller may be of metal construction for strength and wear as well as to provide sufficient weight at this point to obtain good traction.

Thus a standard or universal means may be constructed to fit any of the conventional hand lawn mowers regardless of size, for converting them easily into power driven mowers. This means may be supplied with or without a drive motor, since any suitable motor may be mounted on the platform.

The device may be easily attached and detached whenever desired, thus providing a choice of either hand or power-drive operation at small expense.

Obvious modifications in the form and arrangement of the several parts may be made without departing from the spirit and scope of the present invention, as defined in the appended claim.

What is claimed, is:

A power attachment for hand lawn mower of the type having a pair of side frames and a spacer rod connecting the forward ends of said side frames, said power attachment including a motor having a drive shaft and a drive pulley thereon, a platform on which said motor is fixed, a platform support for said platform on which the platform is slidably mounted, a drive roller at the rear of said side frames, brackets supporting the roller and adjustably mounted on said frame sides, an extensible shaft connecting said brackets, vertically adjustable spaced uprights for supporting said platform support with certain of the uprights positioned adjacent the forward end of the platform support and having their lower ends connected to said spacer rod, other of the uprights being adjacent the rear end of the platform support with their lower ends carried by the extensible shaft, means to hold said adjustable shaft and uprights in adjusted positions, a belt connection between said pulley and drive roller, resilient means connecting said platform and its support for urging said platform forwardly whereby to tighten said belt connection, an ear at the rear end of said platform, a rod rotatably mounted in said ear and having a handle at its rear end, and a pin projecting laterally from said rod and engageable over the rear end of said support to latch the platform in belt loosening position.

LEWIS H. YOCUM.

REFERENCES CITED

The following references are of record in the file of this patent:

UNITED STATES PATENTS

| Number | Name | Date |
| --- | --- | --- |
| 1,966,972 | Seeley | July 17, 1934 |
| 2,066,174 | Cregier | Dec. 29, 1936 |
| 2,070,288 | Mack | Feb. 9, 1937 |
| 2,082,600 | Squires et al. | June 1, 1937 |
| 2,260,344 | Shaw | Oct. 28, 1941 |
| 2,429,378 | Stuebner | Oct. 21, 1947 |